(12) United States Patent
McLean et al.

(10) Patent No.: US 11,044,263 B2
(45) Date of Patent: Jun. 22, 2021

(54) SYSTEMS AND METHODS FOR THREAT DISCOVERY ACROSS DISTINCT ORGANIZATIONS

(71) Applicant: Secureworks Corp., Wilmington, DE (US)

(72) Inventors: Lewis McLean, Edinburgh (GB); Jon Ramsey, Atlanta, GA (US); Nash Borges, Ellicott City, MD (US)

(73) Assignee: SECUREWORKS CORP., Wilmington, DE (US)

( * ) Notice: Subject to any disclaimer, the term of this patent is extended or adjusted under 35 U.S.C. 154(b) by 0 days.

(21) Appl. No.: 17/024,845

(22) Filed: Sep. 18, 2020

(65) Prior Publication Data

US 2021/0006575 A1 Jan. 7, 2021

Related U.S. Application Data

(63) Continuation of application No. 16/006,236, filed on Jun. 12, 2018, now Pat. No. 10,785,238.

(51) Int. Cl.
*H04L 29/06* (2006.01)
*G06F 16/28* (2019.01)

(52) U.S. Cl.
CPC ........ *H04L 63/1416* (2013.01); *G06F 16/285* (2019.01); *H04L 63/1425* (2013.01)

(58) Field of Classification Search
CPC ............. H04L 63/1433; H04L 63/1416; G06F 21/577; G06F 16/285
See application file for complete search history.

(56) References Cited

U.S. PATENT DOCUMENTS 5,937,066 A 8/1999 Gennaro et al.
6,357,010 B1 3/2002 Viets et al.
(Continued)

FOREIGN PATENT DOCUMENTS

EP 3599753 A1 1/2020
WO WO2007/002749 A2 1/2007
(Continued)

OTHER PUBLICATIONS

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.
(Continued)

*Primary Examiner* — Jason K Gee
(74) *Attorney, Agent, or Firm* — Womble Bond Dickinson (US) LLP (57) ABSTRACT

The present disclosure provides systems and methods for organizations to use security date to generate a risk scores associated with potential compromise based on clustering and/or similarities with other organizations that have or may have been compromised. For example, indicators of compromise can be used to create a similarity score rank over time that may be used as a similarity and risk measurement to generate a continual/dynamic score, which can change and/or be updated as new data is created or arrives to detect or prevent threats and/or malicious attacks.

12 Claims, 6 Drawing Sheets

(56) References Cited

U.S. PATENT DOCUMENTS

| | | |
|---|---|---|
| 7,269,578 B2 | 9/2007 | Sweeney |
| 7,331,061 B1 | 2/2008 | Ramsey et al. |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 | 12/2012 | Korablev et al. |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,805,881 B2 | 8/2014 | Hom et al. |
| 8,832,048 B2 | 9/2014 | Lim |
| 8,839,414 B2 | 9/2014 | Mantle et al. |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi et al. |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury et al. |
| 9,548,994 B2 | 1/2017 | Pearcy et al. |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,742,559 B2 | 8/2017 | Christodorescu et al. |
| 9,767,302 B2 | 9/2017 | Lim |
| 9,805,202 B2 | 10/2017 | Medeiros et al. |
| 9,973,524 B2 | 5/2018 | Boyer et al. |
| 10,050,992 B2 | 8/2018 | Thyni et al. |
| 10,116,500 B1 | 10/2018 | Long et al. |
| 10,311,231 B1 | 6/2019 | Kayyoor et al. |
| 10,382,489 B2 | 8/2019 | Das et al. |
| 10,419,903 B2 | 9/2019 | Singh et al. |
| 10,425,223 B2 | 9/2019 | Roth et al. |
| 10,474,820 B2 | 11/2019 | Manadhata |
| 10,491,626 B1 * | 11/2019 | Bhirud .................. G06F 21/566 |
| 10,491,632 B1 | 11/2019 | Natarajan et al. |
| 10,567,407 B2 | 2/2020 | Tang et al. |
| 10,594,713 B2 | 3/2020 | McLean |
| 10,735,470 B2 | 8/2020 | Vidas et al. |
| 10,762,206 B2 | 9/2020 | Titonis et al. |
| 10,785,238 B2 | 9/2020 | McLean |
| 10,834,128 B1 | 11/2020 | Rajagopalan et al. |
| 10,853,431 B1 | 12/2020 | Lin et al. |
| 2002/0129135 A1 | 9/2002 | Delany et al. |
| 2005/0138204 A1 | 6/2005 | Iyer et al. |
| 2005/0288939 A1 | 12/2005 | Peled et al. |
| 2006/0012815 A1 | 1/2006 | Ebner et al. |
| 2006/0037076 A1 | 2/2006 | Roy |
| 2006/0195575 A1 | 8/2006 | Delany et al. |
| 2006/0253447 A1 | 11/2006 | Judge |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos et al. |
| 2008/0255997 A1 | 10/2008 | Bluhm et al. |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2011/0004771 A1 | 1/2011 | Matsushima et al. |
| 2011/0179492 A1 | 7/2011 | Markopoulou et al. |
| 2011/0276604 A1 | 11/2011 | Hom et al. |
| 2012/0117640 A1 | 5/2012 | Ramsey et al. |
| 2012/0185275 A1 | 7/2012 | Loghmani |
| 2012/0246730 A1 | 9/2012 | Raad |
| 2012/0260341 A1 | 10/2012 | Chan et al. |
| 2013/0104191 A1 | 4/2013 | Peled et al. |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta et al. |
| 2014/0222712 A1 | 8/2014 | Samaha et al. |
| 2014/0373151 A1 | 12/2014 | Webb et al. |
| 2015/0019323 A1 | 1/2015 | Goldberg et al. |
| 2015/0040225 A1 | 2/2015 | Coates et al. |
| 2015/0135287 A1 | 5/2015 | Medeiros et al. |
| 2015/0156212 A1 | 6/2015 | Khatri et al. |
| 2015/0186618 A1 | 7/2015 | Poorvin et al. |
| 2015/0222652 A1 | 8/2015 | Ramsey et al. |
| 2015/0271047 A1 | 9/2015 | McLean |
| 2015/0324457 A1 | 11/2015 | McLean |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey et al. |
| 2016/0139886 A1 | 5/2016 | Perdriau et al. |
| 2016/0182546 A1 | 6/2016 | Coates et al. |
| 2016/0241591 A1 | 8/2016 | Ramsey et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 * | 12/2016 | Singla .................. G06F 21/554 726/23 |
| 2017/0026343 A1 | 1/2017 | Wardman |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318034 A1 | 11/2017 | Holland et al. |
| 2018/0077189 A1 | 3/2018 | Doppke et al. |
| 2018/0089574 A1 | 3/2018 | Goto |
| 2018/0091306 A1 | 3/2018 | Antonopoulos et al. |

(56) References Cited

U.S. PATENT DOCUMENTS

| | | |
|---|---|---|
| 2018/0124073 A1 | 5/2018 | Scherman et al. |
| 2018/0124085 A1 | 5/2018 | Frayman et al. |
| 2018/0152480 A1 | 5/2018 | Kinder et al. |
| 2018/0181599 A1 | 6/2018 | Crabtree et al. |
| 2018/0288198 A1 | 10/2018 | Pope et al. |
| 2018/0367550 A1 | 12/2018 | Musuvathi et al. |
| 2019/0014149 A1 | 1/2019 | Cleveland et al. |
| 2019/0050554 A1 | 2/2019 | Fiske |
| 2019/0095801 A1 | 3/2019 | Saillet et al. |
| 2019/0104154 A1 | 4/2019 | Kumar et al. |
| 2019/0122258 A1 | 4/2019 | Bramberger et al. |
| 2019/0132344 A1 | 5/2019 | Lem et al. |
| 2019/0141079 A1 | 5/2019 | Vidas et al. |
| 2019/0149564 A1 | 5/2019 | McLean |
| 2019/0303583 A1* | 10/2019 | Hosking ............ G06Q 10/0639 |
| 2019/0342296 A1 | 11/2019 | Anandam et al. |
| 2019/0377832 A1 | 12/2019 | McLean et al. |
| 2019/0379678 A1 | 12/2019 | McLean et al. |
| 2020/0358795 A1 | 11/2020 | Urbanski et al. |
| 2020/0358819 A1 | 11/2020 | Bowditch et al. |
| 2021/0112087 A1 | 4/2021 | Tassoumt |

FOREIGN PATENT DOCUMENTS

| | | |
|---|---|---|
| WO | WO2007/090605 A1 | 8/2007 |
| WO | WO2010/059843 A2 | 5/2010 |

OTHER PUBLICATIONS

Secureworks—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

\* cited by examiner

SYSTEMS AND METHODS FOR THREAT DISCOVERY ACROSS DISTINCT ORGANIZATIONS

CROSS-REFERENCE TO RELATED APPLICATIONS

This is a continuation of previously filed, co-pending U.S. patent application Ser. No. 16/006,236, filed on Jun. 12, 2018.

INCORPORATED BY REFERENCE

The disclosure and figures of U.S. patent application Ser. No. 16/006,236, filed on Jun. 12, 2018, are incorporated by reference herein for all purposes as if set forth in their entirety.

BACKGROUND

Organizations of all types and sizes face ever increasing threats from malicious attacks or security breaches, including attacks from traditional electronic criminal activity ("e-crime"), and/or from cyber-espionage actors. E-crime actors generally are motivated by monetary reward and often are not concerned about their tactics or actions being discovered and eradicated from individual victims, typically launching widespread spam campaigns and/or ransomware attacks without discriminating as to who they target. Cyber-espionage actors, on the other hand, usually have a specific objective, e.g., corporate espionage, identity theft, political or other attacks, etc. . . . , and generally try to remain more covert and evade detection, which may slow or frustrate their overall operation/goals. For example, it is common to see nation or state-sponsored groups launch cyber-attacks against particular industries or entities without overt flags or readily apparent patterns to such attacks. However, over time, indicators of compromise (IOC's) or other forensic marks or attributes can be revealed, such as when an organization audits their information systems and/or when such security attacks have been discovered. Knowing and curating attributes/marks, techniques or other indicators of compromise indicative of malicious attacks, can aid in threat detection, but when covert techniques are employed, i.e., to make such indicators of compromise more closely mimic more routine business actions/activities, the fidelity of such attributes as predictive of an attack (is lowered), such that using such low fidelity indicators of compromise can create a substantial amount of false positive alerts, which in turn can generate and require costly manual analysis. Accordingly, a need exists for improved detection of security threats across a variety of organizations and/or industries. The present disclosure addresses the foregoing and other related and unrelated problems/issues in the art.

SUMMARY

Briefly described, in one aspect, the present disclosure is directed to systems and methods for the review and use of security related data, such as data logs, raw data, forensic information, etc., that includes low fidelity or risk indicators of compromise (IOC's), to generate risk scores indicative of or associated with potential attacks or acts of compromise, e.g., malicious acts or security threats to individual security clients, based on clustering and/or similarities between such security clients and other organizations that have experienced similar threats associated with such low fidelity IOCs. Such risk scores can be used to determine client threat rankings using probabilities computed utilizing a likelihood that an IOC may be false-positive prone. Such client threat rankings in turn can be used as a similarity and risk measurements to help identify and/or predict new threats of which a client or clients may not be aware. The risk scores further can be dynamically updated or varied as new security data is created or arrives.

In one aspect, a method for threat discovery across distinct organizations or clients can include defining or selecting a series of indicators of compromise. Such indicators of compromise can include, for example, IP addresses, access times and/or dates, email addresses, countries or places of origin, traffic types, or other selected factors or activities that have been found or suspected to be linked to threats or malicious activities.

Forensic information, for example, security logs, specific security related data, raw data, or other suitable information/data associated with the defined/selected indicators of compromise, which may be aggregated by an MSSP or the like, can be accessed and used to curate the list of indicators of compromise based upon their occurrence, i.e., occurrence in known Incident Response (IR) engagements. For example, particular access times and/or dates, IP addresses, and/or other related information generated from IR engagements (e.g. known or detected malicious attacks, identification(s) of threat actors, etc.), involving the defined or selected indicators of compromise can be used to determine similarity scores representative of a fidelity or probability for each selected or defined indicator of compromise or series of indicators of compromise indicating a threat/malicious activity. Such fidelity scoring also can take into account a propensity or likelihood that the selected/defined indicators of compromise will result in or otherwise generate false positives.

The prevalence or recurrence of the indicators of compromise further can be searched across a broad client base, and multiple fractional values indicative of a likelihood of probability of a threat or event occurring with each indicator of compromise can be generated.

Risk scores thereafter will be produced for each of a series of selected or accessed organizations or clients within a client base in which each selected or defined indicator of compromise has been detected in such clients' data, generally over a selected incremental time period such as each hour of a day, day of a set date range, etc., using the fractional values indicating a likelihood of a responsive (e.g., threat) event occurring with the indicator(s) of compromise being generated by each such client, as well as detection of events and/or generated alerts occurring within the selected analysis period.

The client risk scores can be used for ranking client similarities based upon the occurrence/recurrence of the indicators of compromise. These client rankings also can be used to cluster or group organizations/clients into a plurality of similar client groups or clusters. Other clustering grouping information, such as industry type, threat actor motive, employee information, such as number, type of employees, countries of operations, market capital, technology infrastructure, ranked information based on security risks to business or data leakage, disruption, etc. also can be taken into account to group clients. The composite result/output of the rankings of such clustered organizations/clients and their risk scores based on the selected/defined indicators of compromise further can be utilized for identifying possible new threats that a client was not aware of and/or had not yet experienced/detected. In addition, if it is determined that a client has been exposed to a threat or attack, an alarm can be generated and/or remediating or preventative action can be taken for threat prevention for each organization/client in the respective group or cluster.

The various indicators of compromise also can be updated in light of threat detection information and/or other new data. For example, new indicators of compromise can be defined or selected and/or the fidelity of the existing indicators of compromise can be updated or otherwise altered.

In another aspect, a system for threat discovery/detection across distinct organizations/clients can be provided. The system can include a data center, i.e., in one example a data center managed by an MSSP, which includes one or more information handling systems having at least one memory or storage for storing forensic information obtained from monitoring networked systems of one or more organizations or clients of a client base; and at least one processor. The system processor(s) can include programming and will be operable to access forensic information obtained from the security monitoring of the clients of the client base, and relate the accessed forensic information to one or more selected indicators of compromise. The system processor(s) further may be operable to determine a plurality of similarity scores at least partially representative of a fidelity of each of the one or more selected indicators of compromise indicating or evidencing a threat, and to generate risk scores for each of the organizations/clients of the client base experiencing each indicator of compromise. The system also can cluster the organizations/clients into a plurality of threat clusters or groups based at least in part on similarities, risk scores with respect to threats posed and/or additional, suitable clustering information.

If it is determined that an organization/client of the series of selected or accessed organizations/clients have been exposed to a threat or attack, the system can generate an alarm and/or take remediating or preventative action on behalf of each organization/client in the respective threat cluster or group identified to have an appropriate risk or probability of the threat/attack against them.

The system also can rank, generate similarity scores for, or cluster organizations/clients using the former organizations/clients based on the indicators of compromise risk scores determined for each organization/client. The system can allow for searching of a prevalence or recurrence of the one or more indicators of compromise across the client base, and can be operable to generate fractional values indicative of a likelihood of probability of a threat or event occurring with each indicator of compromise of the one or more indicators of compromise.

The system further can be operable to update the one or more indicators of compromise, define new indicators of compromise; and/or update or alter the fidelity of the one or more indicators of compromise based on this analysis/new incoming data. Organizations/clients additionally will be clustered or grouped by the system, such as by plotting values or points representative of a grouped organization's risk based at least in part on the one or more indicators of compromise, risk scores and/or the additional information, and a determination of whether the organizations or clients are significantly similar to each other, e.g., using probabilistic or statistical analysis, a hamming distance, etc.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
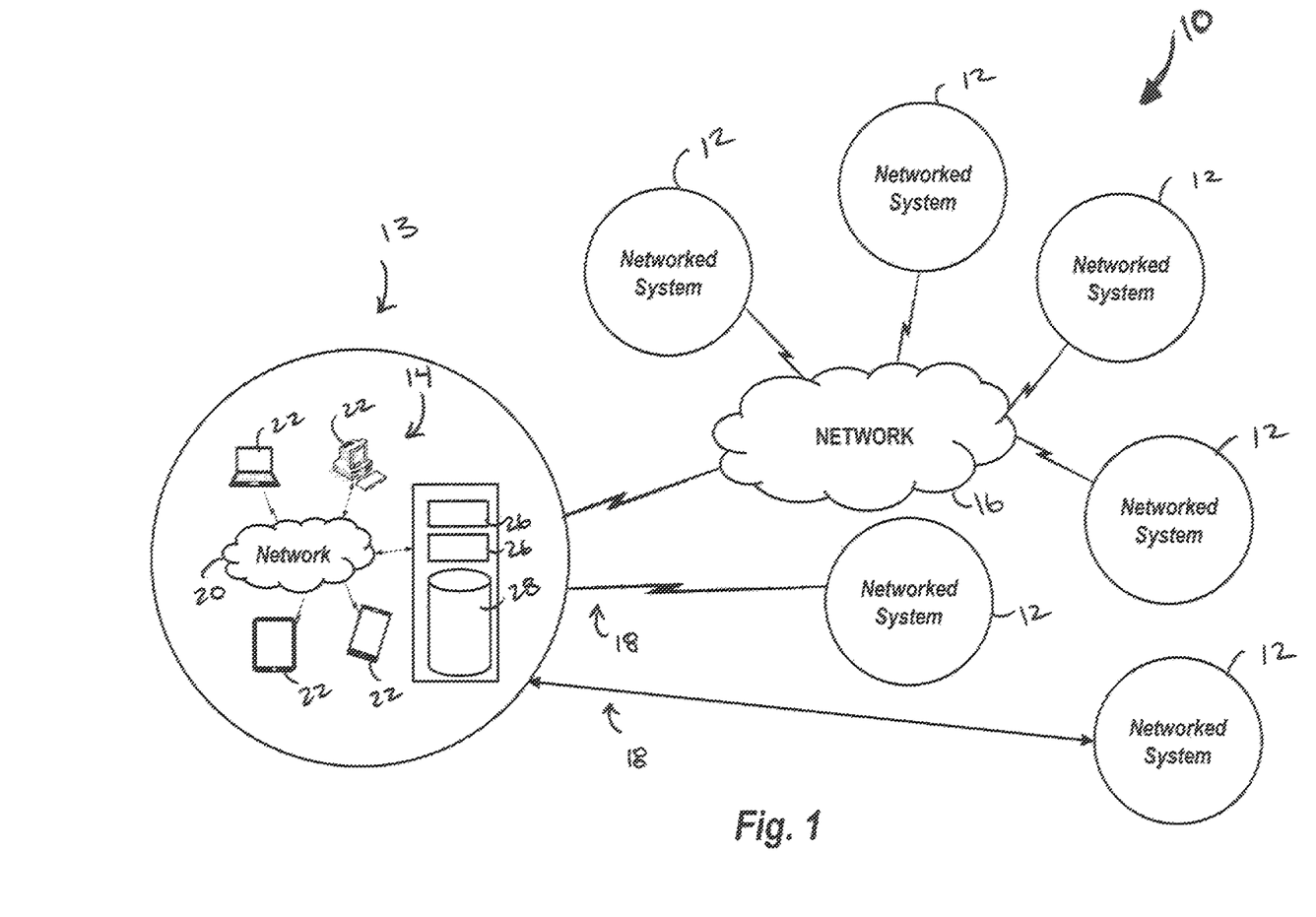
FIG. 1 is a schematic diagram of a system for security information and event management according to one aspect of the present disclosure.

FIG. 1 is a diagram illustrating a security and event management system 10 operable to enable or facilitate discovery of security threats or malicious actions across distinct organizations or clients, by using security data to generate risk scores associated with a series of indicators of compromise (IOC's), including low fidelity indicators of compromise, and utilizing clustering of and/or similarities with other organizations/clients that have or may have been compromised. As shown in FIG. 1, a series of organization/client networked systems 12 can be in communication with a security event management center 13 including one or more data management centers 14 managed, e.g., by an MSSP. The networked systems 12 can communicate with the data center 14 through a network 16, such as a public or private network, e.g., a local area network, though client/customer information handling systems 12 can be in communication with the data center 14 through other suitable lines of communication 18, such as peer to peer file sharing systems, or other suitable wireless, virtual, and/or wired connections. The data center 14 can further include one or more internal networks 20 with a plurality of information handling systems 22, connected thereto. In one embodiment, the information handling systems 22 can include one or more processors 26 and one or more memories or other suitable storage mediums 28. The memory 28 can include a random access memory (RAM), read only memory (ROM), and/or other non-transitory computer readable mediums.

Figure 2:
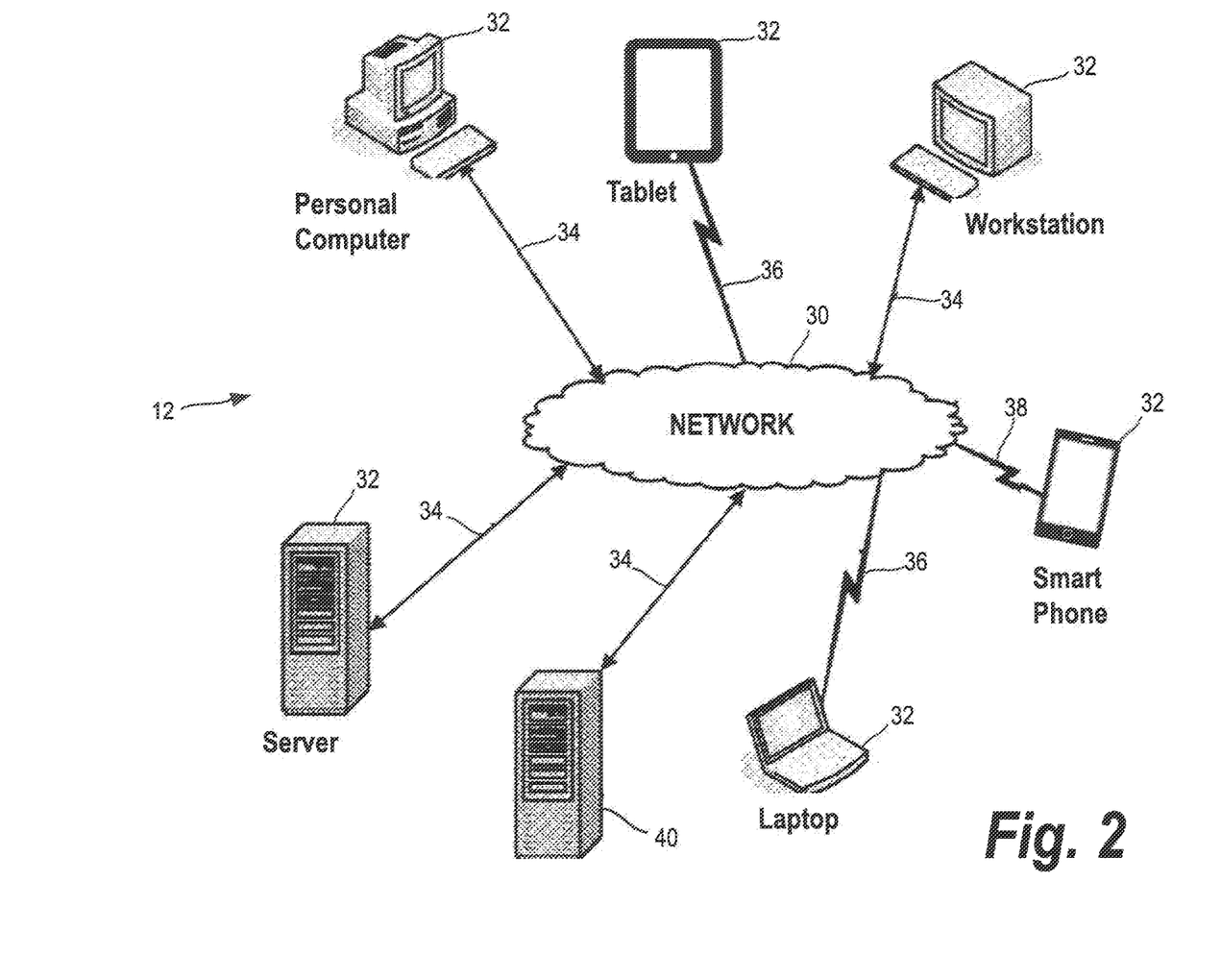
FIG. 2 is a schematic diagram of an organization/client networked system of information handling systems according to one aspect of the present disclosure.

FIG. 2 diagrammatically illustrates an exemplary client/customer networked system 12. The system 12 can include a network 30, which may include the internet or another wide area network, a local area network, or a combination thereof. The network 30 may provide data communications among a series of information handling systems 32, which can include workstations, personal computers, smart cellular telephones, a personal digital assistant(s), laptop computers, servers, and other suitable devices. The information handling systems 32 can be coupled to the network 30 through wireline connections 34, wireless connections 36, such as Wi-Fi or cellular connections, or other suitable lines of communication, or combinations thereof. In some aspects, the information handling systems 32 of the networked systems 12 generally can be configured for a specific user or a specific use, such as financial transaction processing, airline reservations, enterprise data storage, online shopping, global communications, etc.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system also may include one or more buses operable to transmit communications between the various hardware components.

As shown in FIG. 2, the client/customer networked systems 12 further may include one or more monitoring devices 40 communicatively coupled to the network 30, for example, through a wired connection 34, though or other suitable connections, such as a wireless connection, also can be used. The monitoring devices 40 may include a server, a sequence analyzer or various other suitable computing devices that have a processor and a memory or other suitable storage. The memory can include a random access memory (RAM), read only memory (ROM), and/or other non-transitory computer readable medium. The monitoring devices 40 further typically will be operable to store and execute computer readable instructions to continuously monitor, in real-time, activity at each networked system 12, for example, activity of the information handling systems 32 connected to network 30.

Such monitored activity can include logging on and off of the networks by the information handling systems 32, downloads or uploads, changes to settings, IP addressed accessed by or attempting to access the network, the work traffic, etc. Additionally, network activities such as executed processes (i.e., type, number of times accessed, resulting actions, etc.), types and/or numbers of files modified, net flow aggregate, memory forensics, and similar logged or other Digital Forensical and Incident Response (DFIR) investigative activities also can be monitored and collected as part of security log data/records.

The monitoring device(s) 40 communicatively coupled to the organization/client networked system 12 additionally can be configured to aggregate, ingest, or otherwise receive forensic information, such as specific security related data, security or event logs, raw data, and/or other suitable records or information, based at least in part on monitored activity of the plurality of devices 32 and/or the networked systems 12. The security data may be stored in the memory or storage of the monitoring devices 40 and can be communicated to and/or accessed by an MSSP providing security services for the organizations/clients. For example, each monitoring system 40 may automatically send the security data/information to the one or more servers at the MSSP data center, or the MSSP can otherwise directly access the information or security data from the memory or storage of the monitoring device(s) 14.

Forensic analyses/reviews of such data will be performed, e.g., to determine if the data has been threatened or corrupted by an actual attack or malicious actor, and responsive events determined and remediated. The resultant forensic information or security data further can be stored on the memory 28 or in servers or other suitable information handling systems 22 and/or data storage at the security event management center 13, such that the security data is accessible to be analyzed/processed by the MSSP. It further will be recognized that the monitoring devices 40 at the client/customer networked systems 12 are optional, and organizations/clients or technology partners thereof can independently monitor the networked systems, for example, using one or more of the information handling systems 32, and otherwise provide forensic information, security data or other suitable data/information to the MSSP.

With embodiments of the present disclosure, the processor(s) 26 can be operable to run or otherwise access one or more engines, computer program products, platforms, etc. that facilitate the discovery of threats and/or malicious acts across the networked systems 12. For example, the processor(s) 26 can access the forensic information or processed security data and use the information to generate risk scores associated with a series of potential indicators of compromise based on clustering and/or similarities with organizations/clients that have or may have been compromised. For example, the processor(s) 26 can curate specific tools, attributes or marks of detected and/or suspected threats, malicious attacks, threat actors, which can be presented as low fidelity indicators of compromise (i.e., masked or to which covert techniques have been applied) to create similarity score rankings for clients that can be used as a clustering of clients and application of risk measurement to generate risk scores or probabilities indicating or facilitating detection of one or more security threats, actions of malicious actors, etc. These risk scores further generally will be dynamically updated/changed as new security data include such indicators of compromise is received and analyzed.

Figure 3A:
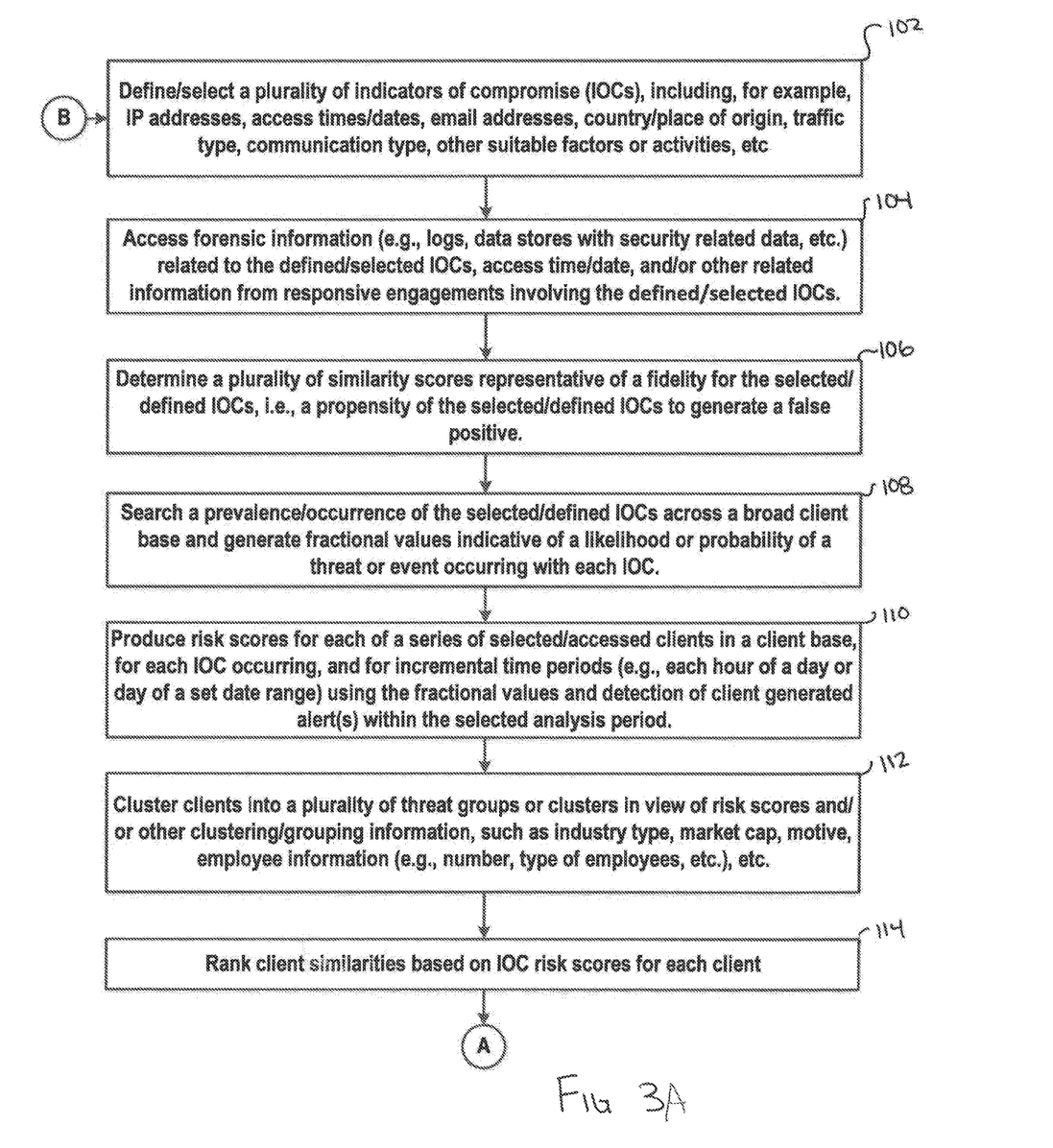
FIGS. 3A-3B are flow diagrams illustrating aspects of the method/process for threat discovery across distinct organizations/clients according to principles of the present disclosure.
Figure 3B:
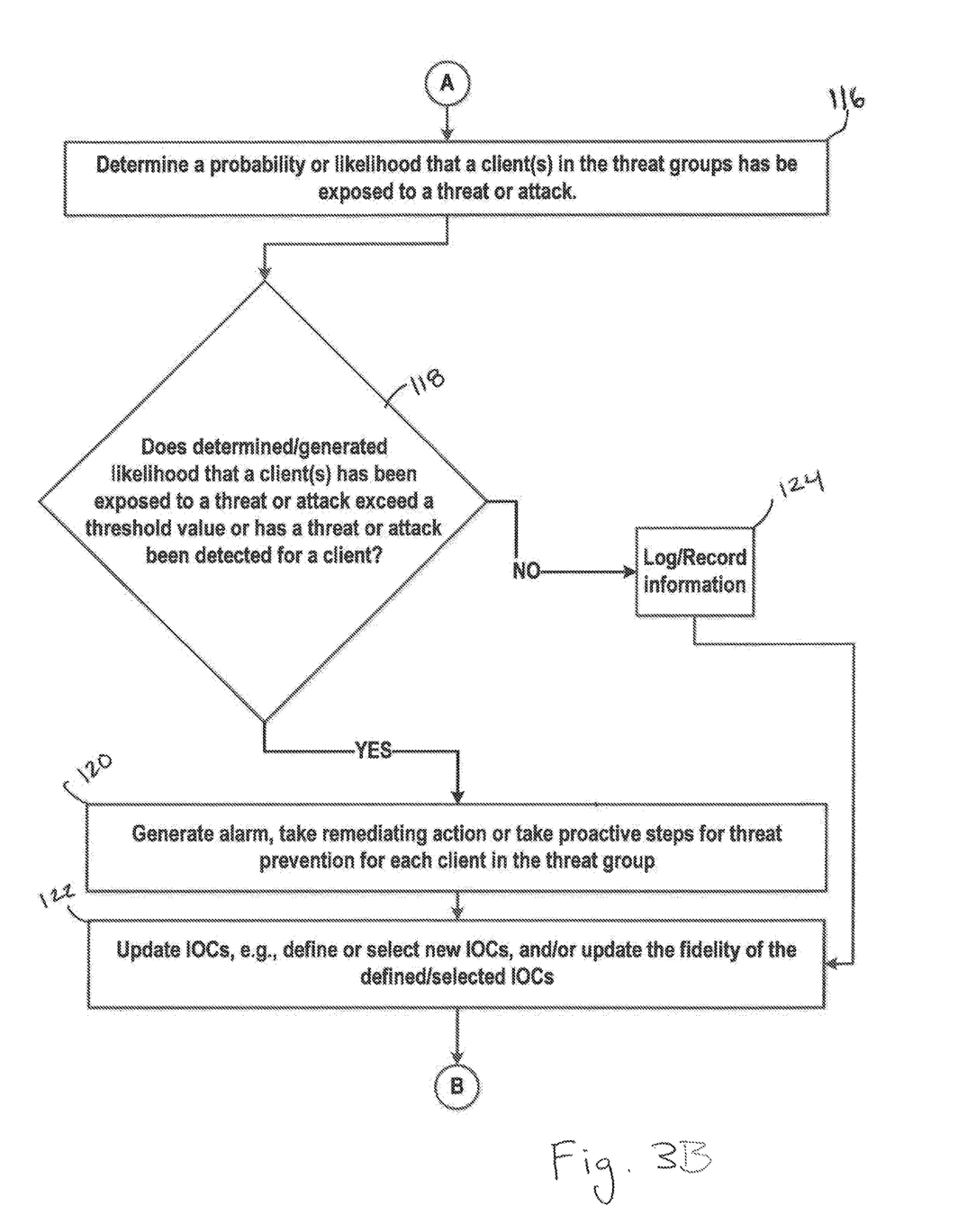

FIGS. 3A-3B illustrate a method/process of threat discovery across distinct organizations according to the present disclosure. As shown in FIG. 3A, the method can include defining or selecting a plurality of indicators of compromise (IOC's) including, for example, IP addresses, access times or dates, email addresses, country or place of origin, traffic type, common communication type, or other suitable factors or activities monitored and collected as part of security monitoring or DFIR activities (at 102).

As indicated at 104, forensic information, such as security logs, data stores with security related data, raw data, etc., e.g., forensic/analyzed security data aggregated by the MSSP or other collective entity (i.e., a threat information sharing group or community), related to or otherwise associated with the defined/selected indicators of compromise, including attributes or features thereof such as access time(s) and/or date(s) and further related information detected from responsive engagements, e.g. known detection(s) of malicious attacks, identification(s) of threat actors, etc., involving the defined or selected indicators of compromise.

Thereafter, at 106, a plurality of initial or similarity scores will be determined. Such similarity scores generally will be representative of a fidelity of the selected or defined indicator of compromise, which fidelity can related to a propensity or likelihood of the selected/defined indicators of compromise to result in or otherwise generate a false positive.

Additionally, as shown at 108, a prevalence or recurrence of the selected or defined indicators of compromise can be searched across the broad client base (i.e., the collected security data of an entire group or a selected sub-set of clients of the MSSP or which are participants in a security threat sharing community) and fractional values indicative of a likelihood of probability of a security threat or event occurring with each indicator of compromise can be generated.

Risk scores then can be produced for and assigned to each of a series of selected or clustered clients of the client base for which each indicator of compromise has been detected, e.g., has been seen/occurring over selected incremental time periods, such as each hour of a day, day of a set date range, or other suitable time period, using the fractional values and also detection of client-generated alerts within the selected analysis period (at 110).

As indicated at 112, clients will be clustered or grouped into a plurality of groups or clusters in view of their risk determined as well as based upon scores other additional clustering or grouping information. By way of example, only such clustering information can include client communities or related/similarities information such as industry type, motive, employee information, such as number, type of employees, etc., countries of operations, market capital, technology infrastructure, ranked information based on security risks to business or data leakage, disruption, user activities, cryptographically hashed application identifiers, etc. In addition, as shown at 114, client similarities can be ranked based on the indicators of compromise risk scores determined for each client.

FIG. 3B further shows that a probability or likelihood that clients in the groups/clusters have been compromised or exposed to a threat or attack accordingly can be determined (e.g., at 116). If it is determined that a client has been exposed to a security threat or attack, or that the probability that the client has been exposed or is likely to be exposed to a security threat or attack exceeds a threshold value, or a known security threat or attack already has been reported/detected for a similarly situated client (at 118), an alarm can be generated and/or remediating or preventative action can be taken for addressing the threat and for prevention of the threat/attack with respect to the other clients in the respective threat group (at 120). The probability or likelihood that a client has been compromised or exposed to a threat or attack, can be determined at least in part using the assigned client risk scores, the fidelity of the selected indicators of compromise, threats/potential attacks detected with respect to similarly clustered clients, and/or other suitable information or data.

At 122, the curated indicators of compromise can be further analyzed and their fidelity updated in light of this information/analysis and/or new, incoming forensic information. For example, new indicators of compromise can be defined or selected, and/or the fidelity of existing indicators of compromise can be updated or otherwise altered (including being at least temporarily removed from a list or lists applicable to some clients) based, at least in part, upon the analysis results and/or new, incoming forensic analysis information (FIG. 3B).

If threat/attack has been detected (e.g., as noted at 118), the analysis information/data can be logged or otherwise reconnected (at 124) and further used for updating the indicators of compromise (e.g., at 122).

After the indicators of compromise have been updated, or new data has been identified in the participating client base, the method/process can return to the initial phase or portion actions of the method/process, and actions 102 to 124 can be repeated. It further will be understood that the actions indicated at 102 to 124 may be rearranged or omitted and other actions or steps may be included, without departing from the scope of the present disclosure.

Figure 4A:
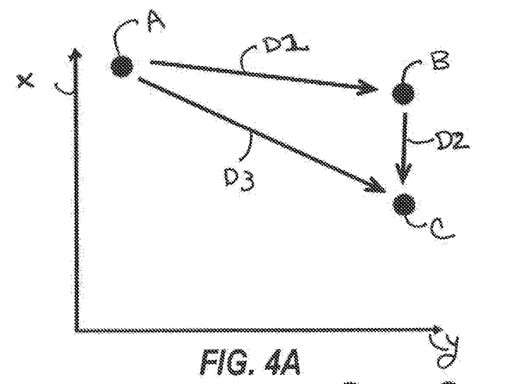
FIG. 4A-C show example plots for use in clustering or grouping the organizations/clients according to principles of the present disclosure.
Figure 4B:
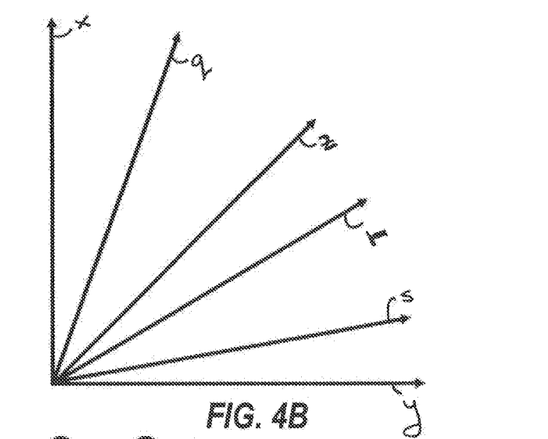
Figure 4C:
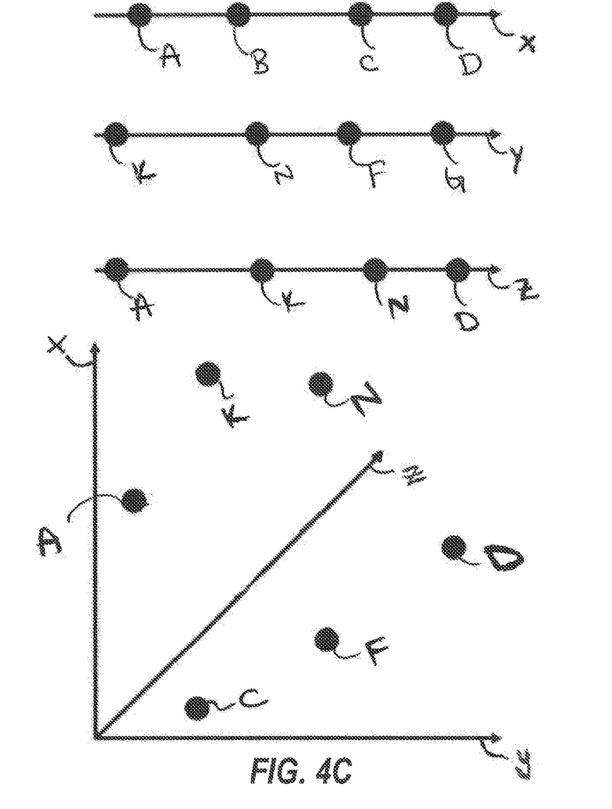

FIGS. 4A-4C show example plots that can be used for the clustering grouping the organizations/clients into the various clusters or groups. As shown in FIGS. 4A-4C, included/participating organizations/clients can be plotted along one or more dimensions based upon their determined risk scores based upon the selected/defined indicators of compromise, which can be dynamically changing, and/or the other additional grouping/clustering information, e.g., market cap, number of employees, etc., which will be more static. Thereafter, the clients/organizations can be grouped or clustered together using a probabilistic or statistical analysis, e.g., to provide a likelihood or probability that certain organizations/clients are substantially similar or substantially not similar to other organizations/clients to facilitate clustering/grouping thereof.

For example, as shown in FIG. 4A, data points for clients A, B, and C can be plotted onto at least one plane, e.g., a plane with x and y dimensions/axes as shown in FIG. 4A, and a hamming distance (e.g., shown as D1, D2, and D3 in FIG. 4A) between each of the points can be calculated to determine a level of similarity therebetween and facilitate clustering or grouping of clients A, B, and C.

FIG. 4C shows an additional example wherein data points based on the client's risk scores and/or other additional clustering information for client's A, B, C, D, K, N, F, and G are plotted across a plurality of dimensions. For example, data points related to client risk scores determined for a particular indicator of compromise can be plotted about an x axis and data points related to the additional clustering information, e.g., market cap and number of employees, can be plotted about a y and a z axis, and these data points can be plotted in three dimensions to determine the groups/clusters, e.g., using statistical analysis, hamming distances, etc.

TABLE 1

| Client | Risk Score | Rankings |
|---|---|---|
| Client 1** | 5.352082 | 1 |
| Client 2 | 0.017080 | 2 |
| Client 3** | 0.009714 | 3 |
| Client 4 | 0.001373 | 4 |
| Client 5 | 0.001350 | 5 |
| Client 6 | 0.000988 | 6 |
| Client 7 | 0.000797 | 7 |

**Malicious actions detected

Table 1 shows an example group or cluster of clients 1-7 (which clients are part of a larger client base, e.g., of up to 100 or more clients) grouped/clustered in view of risk scores and/or additional clustering information. As shown in Table 1, clients 1 and 3 had been compromised by a security threat or malicious actions, for example, based upon detected events or actions (e.g., from monitoring of networked systems of clients 1 and 3 and/or review of forensic information gathered from such monitoring of networked systems managed by clients 1 and 3). Information relating to the detected events or actions was used to set or select the indicators of compromise for the grouping or clustering of clients 1-7 (as well as the other clients in the client base not shown).

As Table 1 further shows, clients 1-7 are ranked based on particular indicators of compromise risk scores attributed to each client. Client 1 had the highest risk score based on the selected/set indicators of compromise, while client 3 had the third highest risk score based on the selected/set indicators of compromise. Accordingly, based on such rankings and/or the detected events/actions for clients 1 and 3, appropriate actions can be taken for the other clients (i.e., clients 2 and 4-7) in the group who did not detect a threat or malicious action so as to address a potentially undiscovered threat or malicious action and/or to reduce the likelihood of exposure to or damage from potential future threats or malicious actions.

For example, client 2 (who had the second highest risk score, but had not yet discovered a threat or malicious actions) can be notified (e.g., by an alert or alarm) that there is a significant likelihood or probability that client 2 also may have been attacked (or that the likelihood of an imminent attach is significant). Thus, client 2 can take preventative and/or remediating actions to address an undetected threat or malicious actions and/or imminent future threats or malicious actions. In addition, clients 4-7 (who had significantly lower risk scores) can be notified (e.g., by an alarm or alert) that they may be or are likely to be attacked in the future, allowing clients 4-7 to take preventative actions/measures to thwart or significantly reduce the risks of future attacks or malicious actions.

Figure 5:
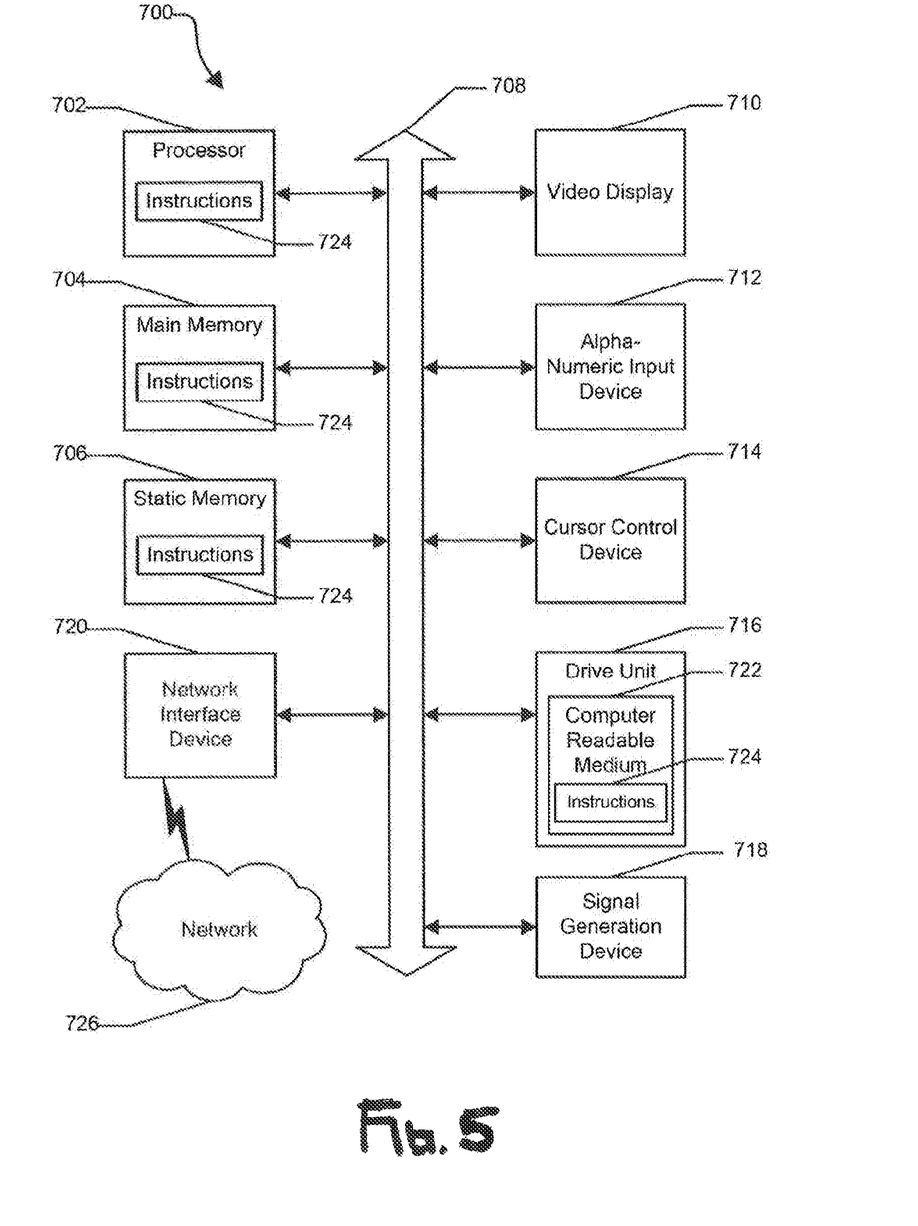
FIG. 5 illustrates an information handling system according to one aspect of the present disclosure.

FIG. 5 shows an example of an information handling system 700 capable of administering each of the specific embodiments of the present disclosure. The information handling system 700 can represent the user information handling systems 22, 32, and 40 of FIGS. 1 and 2, and/or other information handling systems included in or otherwise in communication with the data center 13 and/or the networked systems 12. The information handling system 700 may include a computer system or processor 702 such as a central processing unit (CPU), a graphics processing unit (GPU), or both. Moreover, the information handling system 700 can include a main memory 704 and a static memory 706 that can communicate with each other via a bus 708. The information handling system 700 includes near-field communications (NFC) device and interface 718, such as an antenna and NFC subsystem. The information handling system 700 can also include a disk drive unit 716, and a network interface device 720.

As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, or a cursor control device, such as a mouse or touch pad, or a selectable interface on the display unit. Information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer, and/or any other suitable device without departing from the scope of the present disclosure.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client information handling device in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 706 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network, or other network. The network interface device 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems for various wireless connectivity and radio frequency subsystems for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video, or data or other information data over the network 726. Further, the instructions 724 may be transmitted or received over the network 726 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 706, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for discovery of threats or malicious activities across a plurality of distinct organizations or entities, comprising:
    monitoring a plurality of devices and/or networked systems of the plurality of organizations or entities and receiving security data therefrom;
    defining a plurality of indicators of compromise including a series of detected activities indicative of known or suspected threats or malicious activities on devices or networked systems associated with the plurality of organizations or entities using security data received therefrom;
    determining a prevalence or occurrence of the indicators of compromise across an organization base including at least the plurality of organizations or entities, and generating fractional values indicative of a likelihood or probability of a threat or event occurring for each of the indicators of compromise;
    assigning risk scores for each organization or entity of the plurality of organizations or entities based upon the occurrence of indicators of compromise over a selected incremental time period and the generated fractional values associated therewith;
    clustering organizations or entities of the plurality of organizations or entities into a plurality of threat clusters based at least in part on the assigned risk scores for each organization or entity of the plurality of organizations or entities;
    determining a probability that clustered organizations or entities in the plurality of threat clusters have been exposed to security threats or attacks; and
    when the probability that at least one clustered organization or entity within a threat cluster has been exposed to security threats or attacks meets a prescribed threshold, notifying other clustered organizations or entities within the threat cluster.

2. The method of claim 1, wherein the indicators of compromise include IP addresses, access times or dates, email addresses, country or place of origin, traffic type, common communication types, or combinations thereof.

3. The method of claim 1, further comprising generating a hamming distance between the plurality of organizations or entities; and determining a level of similarity between the plurality of organizations or entities based at least in part on the hamming distance to facilitate clustering thereof.

4. The method of claim 1, wherein clustering organizations or entities of the plurality of organizations or entities into a plurality of threat clusters further comprises clustering organizations or entities based upon additional clustering information including industry type, market cap, motive, employee information, countries of operations, market capital, technology infrastructure, ranked information based on security risks to business or data leakage, disruption, and/or combinations thereof.

5. The method of claim 1, wherein monitoring the plurality of devices and/or networked systems associated with the plurality of organizations or entities further comprises aggregating or ingesting the security data received therefrom.

6. The method of claim 1, further comprising taking one or more remediating actions or proactive steps for each clustered organization or entity in the threat cluster.

7. A system for threat or malicious activity detection across a plurality of distinct organizations, comprising:
    one or more memories storing instructions; and
    one or more processors executing the instructions stored in the one or more memories, wherein the processors execute the instructions to:
        monitor a plurality of devices and/or networked systems of the plurality of organizations or entities and receive security data therefrom;
        define a plurality of indicators of compromise indicative of activities linked to threats or malicious activities on devices and/or networked systems associated with the plurality of distinct organizations using security data obtained therefrom;
        search a prevalence or occurrence of the indicators of compromise across an organization base including at least the organizations within the plurality of distinct organizations, and generate values indicative of a likelihood or probability of a threat or event occurring for each indicator of compromise;
        assign risk scores for each organization of the plurality of distinct organizations based upon occurring indicators of compromise over a selected incremental time period and the generated values associated therewith;
        cluster organizations of the plurality of distinct organizations into one or more threat clusters based at least in part on the assigned risk scores, and determine a probability or likelihood that at least one clustered organization in at least one or more of the threat clusters have been exposed to security threats or attacks; and
        when the determined probability or likelihood meets a threshold value, notifying the clustered organizations within the threat cluster.

8. The system of claim 7, wherein the indicators of compromise include IP addresses, access times or dates, email addresses, country or place of origin, traffic type, common communication types, or combinations thereof.

9. The system of claim 7, wherein the system is operable to generate a plot of data points based at least in part on the risk scores and additional clustering information, for clustered the organizations, generate a hamming distance between the plotted organizations for determining a level of similarity between the plurality of organizations to facilitate clustering thereof.

10. The system of claim 9, wherein the additional clustering information includes industry type, market cap, motive, employee information, countries of operations, market capital, technology infrastructure, ranked information based on security risks to business or data leakage, disruption, and/or combinations thereof.

11. The system of claim 7, wherein the system is operable to monitor the plurality of devices and/or networked systems associated with the plurality of organizations for aggregating or ingesting the security data.

12. The system of claim 7, wherein the system is operable to take one or more remediating actions or proactive steps for each clustered organization in the threat cluster if the probability or likelihood of at least one clustered organization of the threat cluster having been exposed to security threats or attacks exceeds the threshold value.

* * * * *